United States Patent
Brown et al.

(10) Patent No.: US 10,239,622 B2
(45) Date of Patent: Mar. 26, 2019

(54) OUTFLOW VALVE HAVING SUPER-ELLIPTICAL BELLMOUTH

(71) Applicant: HONEYWELL INTERNATIONAL INC., Morristown, NJ (US)

(72) Inventors: Daniel Brown, Surprise, AZ (US); Yogendra Yogi Sheoran, Scottsdale, AZ (US); Bruce Dan Bouldin, Phoenix, AZ (US); William Facinelli, Lafayette, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 509 days.

(21) Appl. No.: 14/864,127

(22) Filed: Sep. 24, 2015

(65) Prior Publication Data

US 2017/0088270 A1 Mar. 30, 2017

(51) Int. Cl.
*B64D 13/04* (2006.01)
*B64D 13/02* (2006.01)

(52) U.S. Cl.
CPC ............. *B64D 13/04* (2013.01); *B64D 13/02* (2013.01)

(58) Field of Classification Search
CPC ............................... B34D 13/04; B34D 13/02
USPC ........................................................... 454/73
See application file for complete search history.

(56) References Cited

U.S. PATENT DOCUMENTS

| | | |
|---|---|---|
| 8,342,920 B2 | 1/2013 | Tanner et al. |
| 8,632,381 B2 | 1/2014 | Horner et al. |
| 9,096,320 B2 | 8/2015 | Horner et al. |
| 2004/0149340 A1 | 8/2004 | Steinert et al. |
| 2010/0096503 A1 | 4/2010 | Tanner et al. |
| 2011/0177770 A1* | 7/2011 | Tanner .................. B64D 13/04 454/74 |
| 2013/0186497 A1 | 7/2013 | Royalty et al. |

OTHER PUBLICATIONS

Extended EP Search Report for Application No. 16190009.7-1754 dated Jun. 12, 2016.
Reed, H., et al. "Transition Receptivity and Control: Computations," Arizona State University, Mar. 15, 1990-Sep. 30, 1993.

* cited by examiner

*Primary Examiner* — Gregory Huson
*Assistant Examiner* — Ryan Faulkner
(74) *Attorney, Agent, or Firm* — Lorenz & Kopf, LLP

(57) ABSTRACT

An outflow valve is provided. The outflow valve includes a frame and a first door rotatably coupled to the frame. The first door has a first side opposite a second side and a bellmouth. The bellmouth is defined by a super-ellipse, with a major axis of the super-ellipse substantially parallel to the second side and a minor axis of the super-ellipse substantially perpendicular to the second side. The outflow valve also includes a second door rotatably coupled to the frame. The first door and the second door are substantially simultaneously movable between at least a first position and a second position.

19 Claims, 5 Drawing Sheets

OUTFLOW VALVE HAVING SUPER-ELLIPTICAL BELLMOUTH

TECHNICAL FIELD

The present disclosure generally relates to aircraft systems, and more particularly relates to an outflow valve for a cabin air pressure control system, which includes a super-elliptical bellmouth.

BACKGROUND

Certain mobile platforms, such as aircraft, are commonly equipped with Cabin Pressure Control Systems (CPCSs), which maintain cabin air pressure within a desired range to increase passenger comfort during flight. A representative CPCS may include an outflow valve. The outflow valve is fluidly coupled between the aircraft's cabin and an ambient pressure external to the aircraft (referred to herein as "ambient"). During operation of the CPCS, the outflow valve is moved between various positions to control the rate at which pressurized air from the aircraft's cabin is vented to ambient. By moving the outflow valve between the various positions, the CPCS may maintain the aircraft's cabin pressure within a desired range. Furthermore, the outflow valve may be positioned such that the pressurized air exhausted by the outflow valve provides additional forward thrust to the aircraft.

However, by fluidly coupling the outflow valve to the aircraft cabin and the ambient pressure external to the aircraft, the operation of the outflow valve may generate undesirable noise in the aircraft cabin. In one example, the flow of air through the outflow valve during climb or descent of the aircraft may result in tonal noise within the aircraft cabin, which is undesirable. In order to mitigate the tonal noise, certain outflow valves include one or more vortex generators. In certain instances, however, these vortex generators may create broadband noise during cruise operation of the aircraft, which is also undesirable to occupants in the aircraft cabin.

Accordingly, it is desirable to provide an improved outflow valve, which reduces both tonal noise and broadband noise within the aircraft cabin, while maintaining cabin air pressure and providing additional forward thrust to the aircraft. Furthermore, other desirable features and characteristics of the present invention will become apparent from the subsequent detailed description and the appended claims, taken in conjunction with the accompanying drawings and the foregoing technical field and background.

SUMMARY

According to the various teachings of the present disclosure, an outflow valve is provided. The outflow valve includes a frame and a first door rotatably coupled to the frame. The first door has a first side opposite a second side and a bellmouth. The bellmouth is defined by a super-ellipse, with a major axis of the super-ellipse substantially parallel to the second side and a minor axis of the super-ellipse substantially perpendicular to the second side. The outflow valve also includes a second door rotatably coupled to the frame. The first door and the second door are substantially simultaneously movable between at least a first position and a second position.

Further provided is a cabin pressure control system. The cabin pressure control system includes an actuator and an outflow valve having a frame. The outflow valve includes a first door and a second door. The first door and the second door are rotatably coupled to the frame and at least one of the first door and the second door are coupled to the actuator to be movable by the actuator. The first door has a first side, a second side and includes a bellmouth. The bellmouth is defined by a super-ellipse such that a minor axis of the super-ellipse is substantially perpendicular to the second side, the second side including a profile defined along a portion of the second side between a first end and a second end of the second side. The cabin pressure control system also includes a controller in communication with the actuator that commands the actuator to move the outflow valve between at least a first position and a second position.

Also provided is an aircraft. The aircraft includes a fuselage that encloses a cabin and a cabin pressure control system coupled to the fuselage. The cabin pressure control system is operable for venting a fluid from the cabin into an environment external to the aircraft. The cabin pressure control system includes an actuator and an outflow valve having a frame. The outflow valve includes a first door and a second door. The first door and the second door are rotatably coupled to the frame and at least one of the first door and the second door are coupled to the actuator to be movable by the actuator. The first door having a first side, a second side and including a bellmouth defined by a super-ellipse such that a minor axis of the super-ellipse is substantially perpendicular to the second side and a major axis of the super-ellipse is substantially parallel to the second side. The second side includes a rounded profile defined along a portion of the second side between a first end and a second end of the second side. The second door is coupled to the frame so as to be forward of the first door in a direction of flight of the aircraft. The cabin pressure control system also includes a controller in communication with the actuator that commands the actuator to move the outflow valve between at least a first position and a second position for venting the fluid.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any valve that is controllable to enable fluid flow, and that the outflow valve described herein is merely one exemplary embodiment according to the present disclosure. Moreover, while the outflow valve is described herein as being used onboard a mobile platform, such as an aircraft, it should be noted that the outflow valve may be used on any suitable mobile platform, such as a bus, motorcycle, train, motor vehicle, marine vessel, rotorcraft and the like. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the cabin pressure control system described herein is merely one exemplary embodiment of the present disclosure.

In addition, for the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
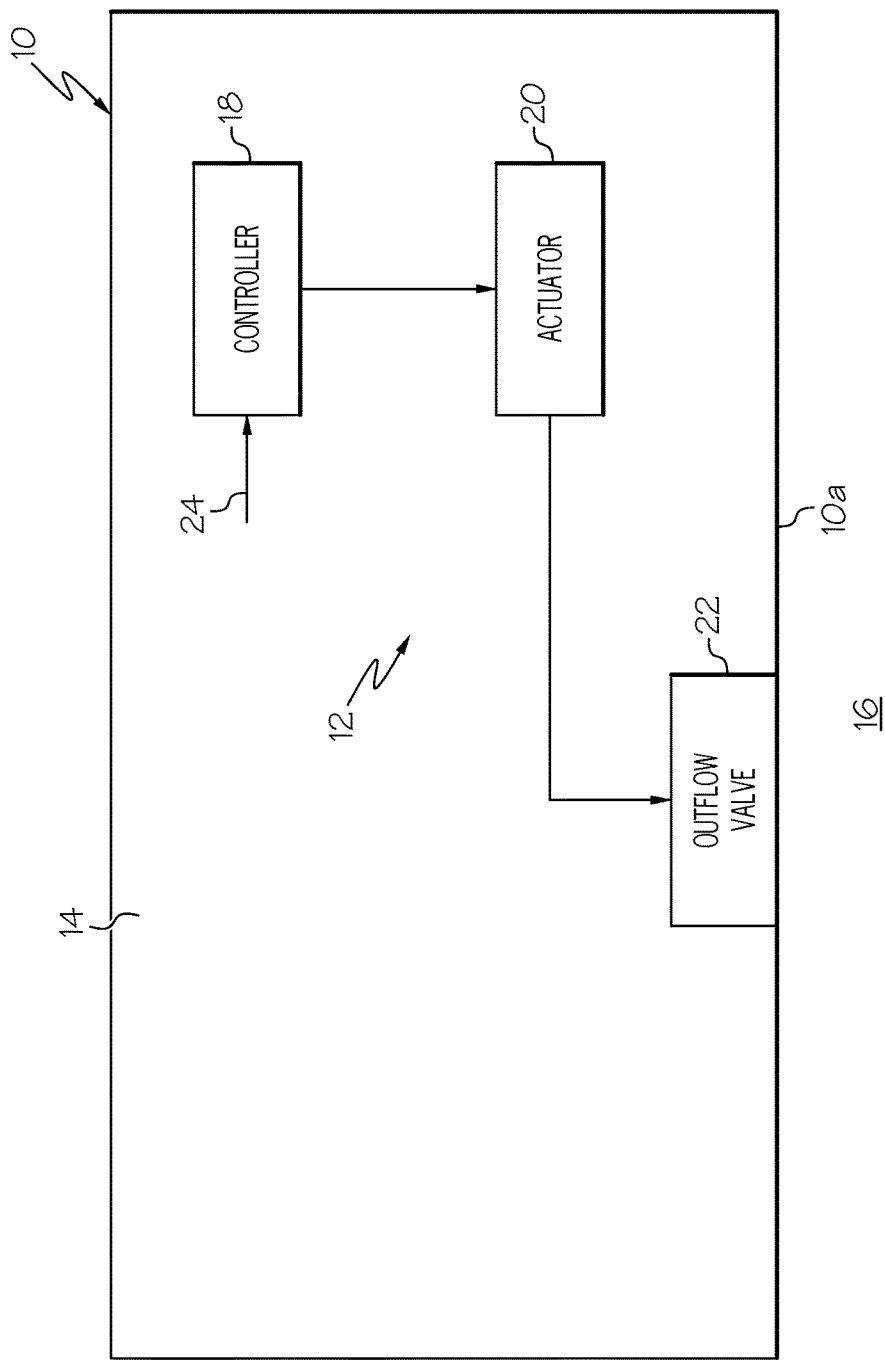
FIG. 1 is a schematic illustration of a mobile platform that includes an outflow valve in accordance with various embodiments.

With reference to FIG. 1, a simplified block diagram of a mobile platform, such as an aircraft 10, is shown. While in this example, the mobile platform is the aircraft 10, it should be understood that the mobile platform may comprise any suitable mobile platform, such as a bus, motorcycle, train, motor vehicle, marine vessel, rotorcraft and the like. The aircraft 10 includes a cabin pressure control system 12, which serves to regulate or maintain a pressure in a cabin, generally identified as 14, of the aircraft 10. The cabin 14 is generally enclosed by the fuselage 10a. The cabin pressure control system 12 also provides additional forward thrust to the aircraft 10 when venting pressurized air from the cabin 14 of the aircraft 10 to an ambient pressure, such as pressure external to a fuselage 10a of the aircraft 10. The ambient pressure is generally identified as 16 and generally has a pressure that is lower than a pressure in the cabin 14 of the aircraft 10. In one example, the cabin pressure control system 12 also includes a controller 18, an actuator 20 and an outflow valve 22. While the aircraft 10 is illustrated in FIG. 1 as including a single outflow valve 22, the aircraft 10 may include one or more outflow valves 22, such as a first outflow valve coupled near a nose of the aircraft 10 and a second outflow valve coupled near a tail of the aircraft 10. Thus, the arrangement shown in FIG. 1 is merely an example.

The controller 18 is in communication with or coupled to the actuator 20. The controller 18 comprises any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The controller 18 may be coupled to the actuator 20 via any suitable communication architecture that facilitates the transfer of data, power, etc., such as a bus. The controller 18 is responsive to one or more inputs 24 and/or to a predetermined schedule to command the actuator 20 to move the outflow valve 22 into one of various positions, including, but not limited to, a fully open position, a fully closed position and any number of positions in-between. By actively controlling the movement of the outflow valve 22, the controller 18 maintains the pressure in the cabin 14 of the aircraft 10 within a desired range during flight and may also assist with the generation of additional thrust during a climb operation of the aircraft 10. The one or more inputs 24 to the controller 18 may comprise one or more signals from a sensor associated with the aircraft 10, such as a pressure sensor in communication with or operatively coupled to the controller 18.

The actuator 20 is in communication with the controller 18, and is coupled to the outflow valve 22. In one example, with reference to FIG. 2, the actuator 20 comprises one or more drive motors, such as a first drive motor 26 and a second drive motor 28; and the outflow valve comprises a first, aft door 30, a second, forward door 32 and a frame 34. Each of the first drive motor 26 and the second drive motor 28 are coupled to the first, aft door 30 and the second, forward door 32 of the outflow valve 22 to move the outflow valve 22 between the various positions. The first drive motor 26 and the second drive motor 28 are also coupled to or coupled adjacent to the frame 34. The first drive motor 26 and the second drive motor 28 may comprise any suitable motor or actuator that is capable of moving the first, aft door 30 and the second, forward door 32 between various positions, such as a first, fully closed position (FIG. 3), a second, fully opened position (FIG. 4), and various intermediate positions therebetween. Thus, the first drive motor 26 and the second drive motor 28 may comprise a hydraulic drive motor, electric drive motor, etc.

In one example, the first, aft door 30 includes a first arm 36, and the second, forward door 32 includes a second arm 38. The first arm 36 is coupled to the actuator 20 at a first end 36a and is coupled to the first, aft door 30 at a second end 36b. The second arm 38 is coupled to the actuator 20 at a third end 38a and is coupled to the second, forward door 32 at a fourth end 38b. In one example, the first arm 36 is coupled to the actuator 20 via a master linkage 40, such as a bell crank type linkage, and the second arm 38 is coupled to the actuator 20 via a slave linkage 44. The master linkage 40 transfers motion from the actuator 20 to the first, aft door 30 to enable the movement of the first, aft door 30 and the second, forward door 32 relative to the frame 34. The slave linkage 44 couples the first arm 36 and the second arm 38, and ensures the cooperative movement of the first, aft door 30 and the second, forward door 32. As a result of the mechanical coupling between the first arm 36, the second arm 38, the master linkage 40 and the slave linkage 44, the first, aft door 30 and the second, forward door 32 move substantially simultaneously between the fully closed position (FIG. 3) and the fully open position (FIG. 4) when driven by the actuator 20.

Figure 3:
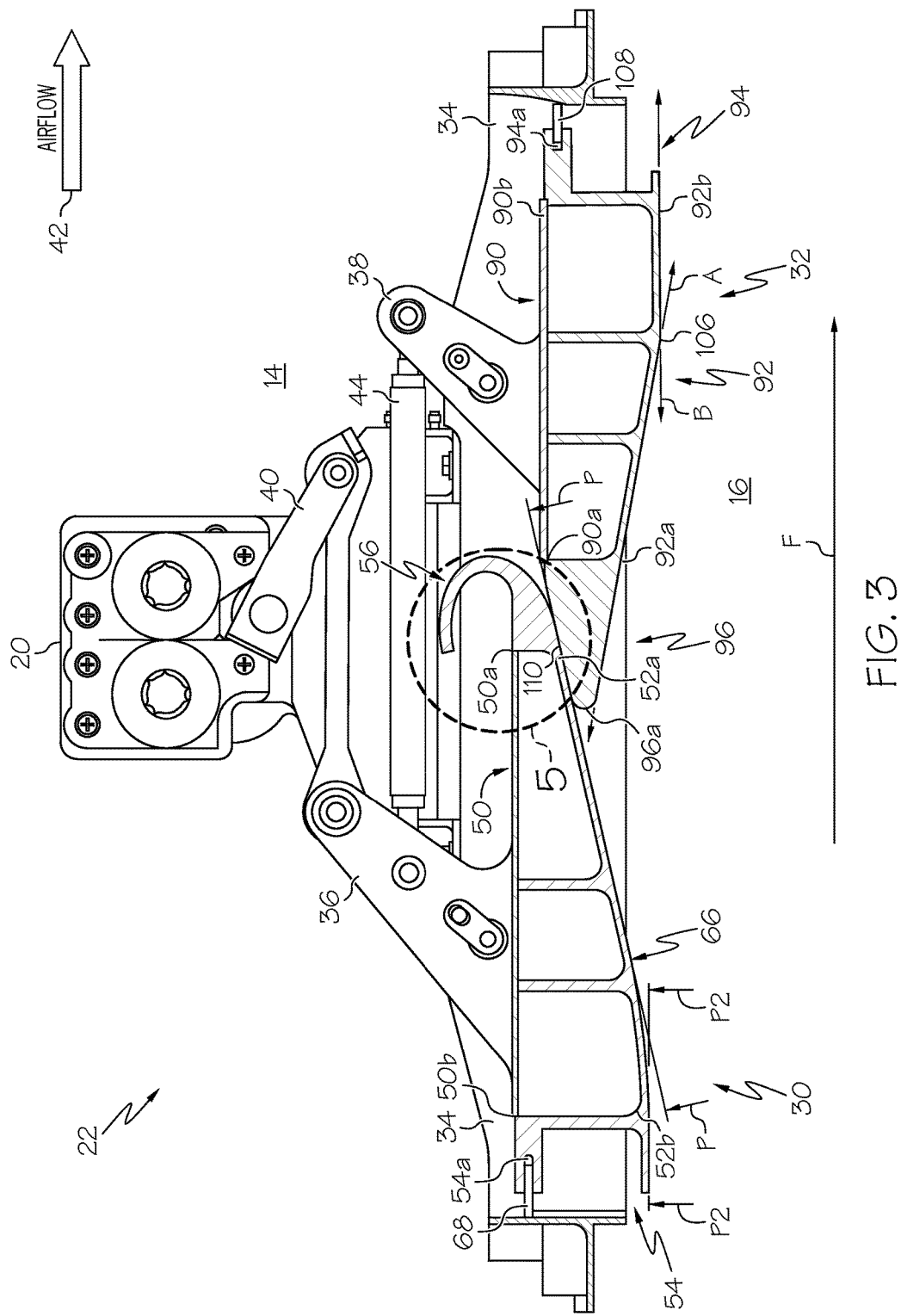
FIG. 3 is a cross-sectional illustration of the outflow valve of FIG. 2, taken along line 3-3 of FIG. 2, illustrating the outflow valve in a first, fully closed position in accordance with various embodiments.
Figure 4:
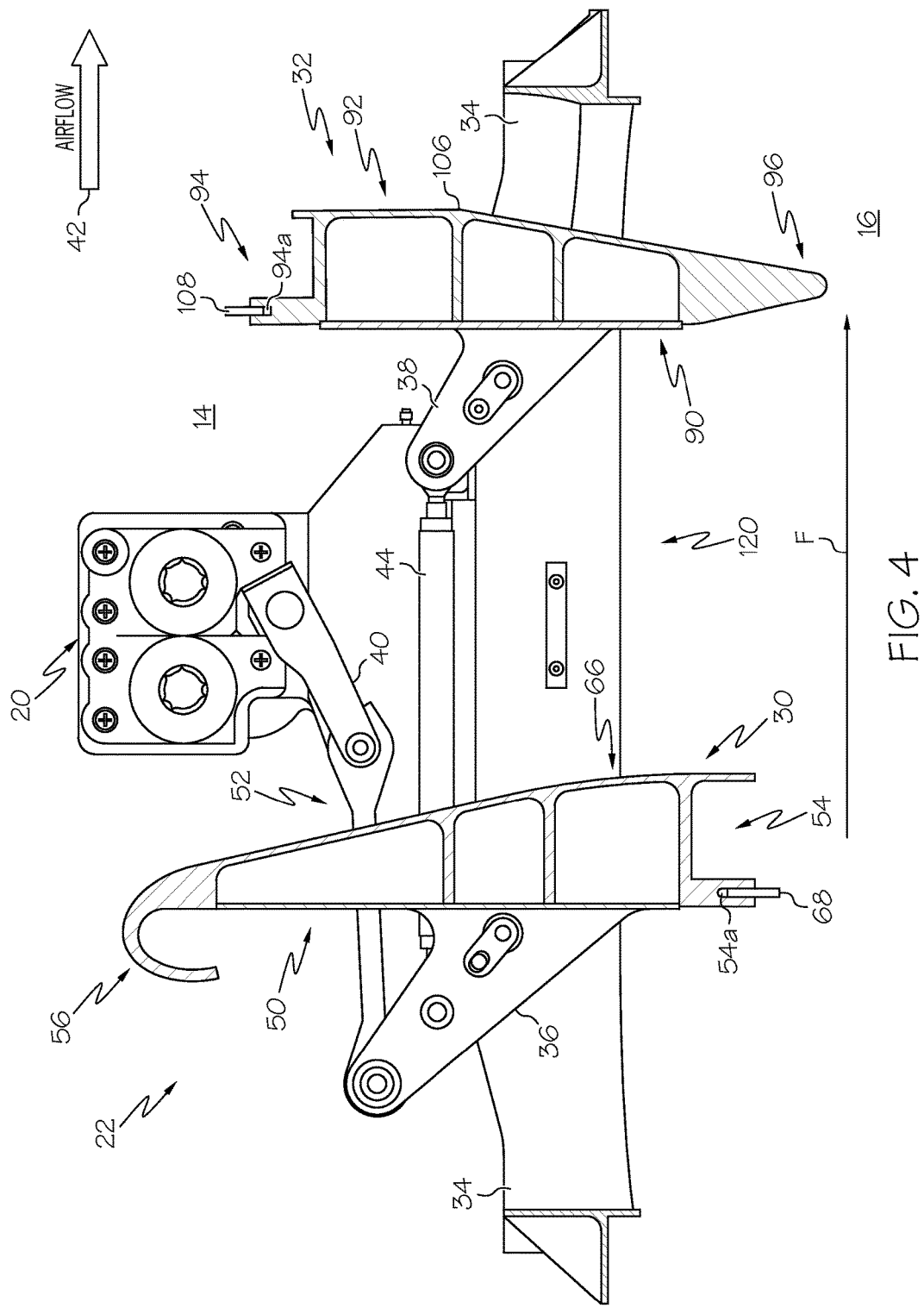
FIG. 4 is a cross-sectional illustration of the outflow valve of FIG. 2, taken along line 3-3 of FIG. 2, illustrating the outflow valve in a second, fully opened position in accordance with various embodiments.

As discussed, the outflow valve 22 includes the first, aft door 30, the second, forward door 32 and the frame 34. Generally, the outflow valve 22 is coupled to the fuselage 10a (FIG. 1) such that the first, aft door 30 is closer to a rear or tail of the aircraft 10 than the second, forward door 32, which is closer to a nose of the aircraft 10 as indicated in FIGS. 3 and 4 by airflow arrow 42. Stated another way, the second, forward door 32 is positioned in front of the first, aft door 30 along a direction of movement or flight F associated with the aircraft 10. In this example, the outflow valve 22 is mounted through the aircraft's underbelly proximate the tail of the aircraft 10. It should be understood, however, that the outflow valve 22 may be mounted at any circumferential clocking position on the fuselage 10a, and thus, the mounting of the outflow valve 22 near the tail of the aircraft 10 is merely an example. The first, aft door 30 generally overlaps the second, forward door 32 in the fully closed position, as illustrated in FIG. 3. The first, aft door 30 and the second, forward door 32 may each be composed of a suitable material, such as a metal, metal alloy, etc., and may each be manufactured through a suitable technique, such as casting, machining, etc. With reference to FIG. 3, the first, aft door 30 includes a first, interior side 50, a second, exterior side 52, an end 54 and a bellmouth 56.

Figure 2:
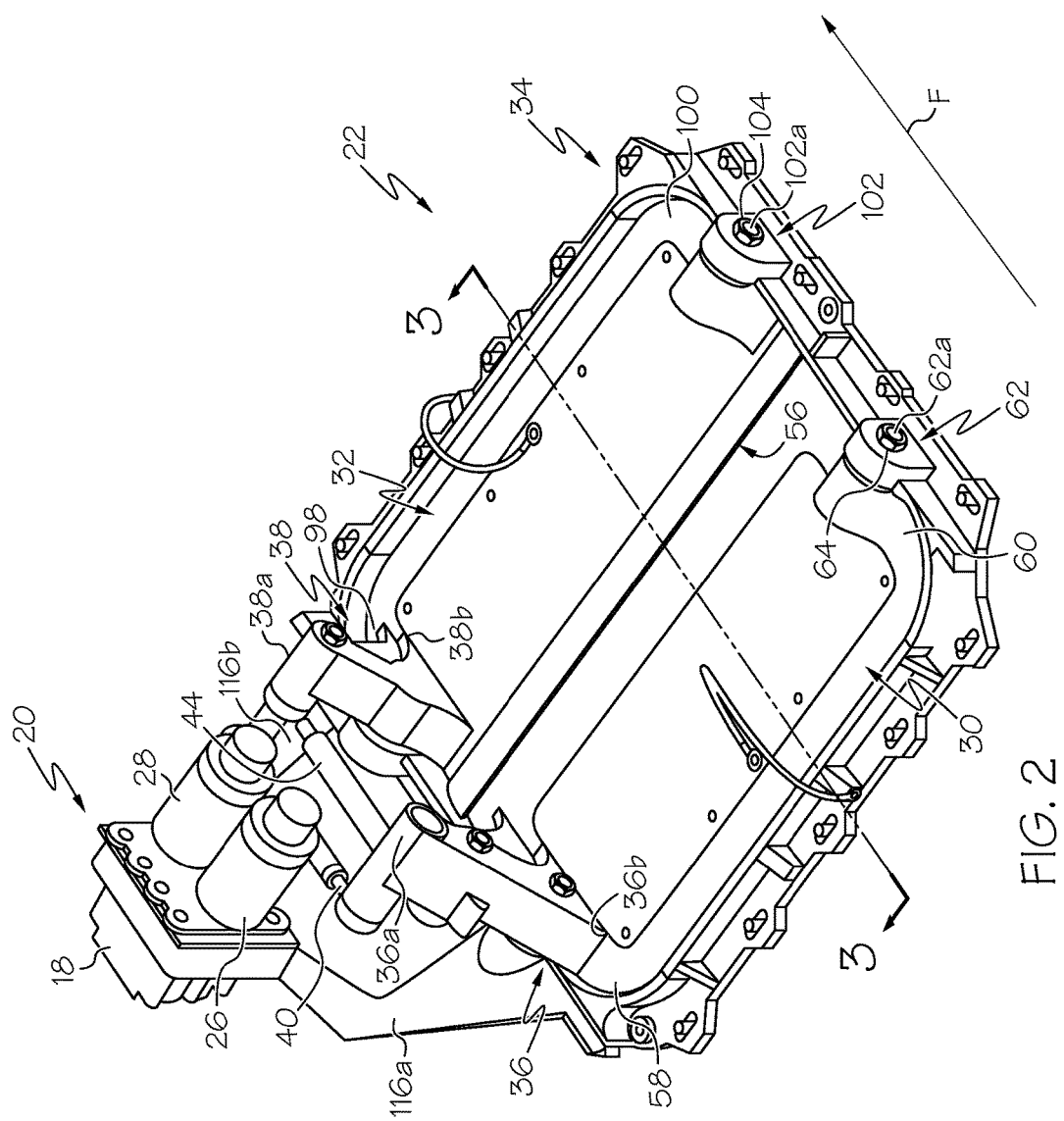
FIG. 2 is a perspective view of the outflow valve of FIG. 1, in accordance with various embodiments.

The interior side 50 is contained within the cabin 14 in the fully closed position (FIG. 3), and is subject to an air pressure within the cabin 14. Generally, the interior side 50 is substantially planar from a tip 50a of the interior side 50 to a base 50b of the interior side 50. The first arm 36 is coupled to the interior side 50, and with reference to FIG. 2, is generally coupled to the interior side 50 so as to be at a first end 58 of the first, aft door 30, which is substantially opposite a second end 60 of the first, aft door 30. The second end 60 includes a pivot 62. The pivot 62 forms a pivot point for the first, aft door 30 relative to the frame 34. In one example, the pivot 62 comprises a pivot pin 62a, which is received within a corresponding bore 64 defined through the frame 34. The pivot pin 62a may be retained within the bore 64 via any suitable mechanism, such as a nut, cotter pin, etc. It should be noted that any suitable arrangement may be used to pivotably couple the first, aft door 30 to the frame 34, and thus, the pivot 62 is merely exemplary. Moreover, the first, aft door 30 may include a bore that receives a pivot pin associated with the frame 34.

With reference to FIG. 3, the exterior side 52 is generally opposite the interior side 50. The exterior side 52 is external to the cabin 14 when the outflow valve 22 is in the fully closed position and is subject to the ambient pressure 16. The exterior side 52 includes a first end 52a, a second end 52b and a profile 66. The first end 52a is disposed substantially opposite the tip 50a of the interior side 50 and the second end 52b is disposed substantially opposite the base 50b of the interior side 50. The profile 66 is defined between the first end 52a and the second end 52b. In one example, the profile 66 comprises a rounded profile, and serves to connect the first end 52a with the second end 52b with a substantially continuous curvature, thereby reducing flow separation. Generally, the profile 66 is defined or formed without discrete changes in slope along the profile 66. Stated another way, the profile 66 comprises a rounded surface defined along the exterior side 52 between the first end 52a and the second end 52b, which interconnects a plane P defined along an upstream surface of the exterior side 52 near the first end 52a and a plane P2 defined along a downstream surface of the exterior side 52 near the second end 52b. Generally, the plane P is defined along the upstream surface of the exterior side 52 and extends in a direction along a longitudinal axis of the first, aft door 30, and the plane P2 is defined along the downstream surface of the exterior side 52 and extends in a direction along the longitudinal axis of the first, aft door 30. By including the profile 66 on the first, aft door 30, a sharp corner is avoided as the first, aft door 30 transitions from upstream to downstream, thereby reducing a potential for flow separation.

With reference to FIG. 3, the end 54 extends between the base 50b of the interior side 50 and the second end 52b of the exterior side 52. Thus, the end 54 is generally adjacent to the frame 34 when the first, aft door 30 is coupled to the frame 34. In one example, the end 54 includes a first seal 68. The first seal 68 may extend substantially along an entirety of the end 54 to seal against the frame 34. It should be noted that while not illustrated herein, the first seal 68 may also extend along the first end 58 and the second end 60 (FIG. 2) of the first, aft door 30 to seal the edges of the first, aft door 30 against the frame 34 in the fully closed position. The first seal 68 may be partially embedded within (e.g., dovetail with) a slot 54a defined in the end 54. If desired, the first seal 68 may be energized by a wave spring or other suitable means. The first seal 68 may be formed from various conventionally-known polymeric materials including, for example, extruded silicone or polytetrafluoroethylene (e.g., Teflon®). The first seal 68 may comprise a single piece or a multi-piece seal.

The bellmouth 56 extends from the first end 58 to the second end 60 of the first, aft door 30 (FIG. 2). The bellmouth 56 has a super-elliptical shape, and may be referred to herein as a "super-elliptical bellmouth." With reference to FIG. 5, the bellmouth 56 is defined near or at the tip 50a of the interior side 50 and the first end 52a of the exterior side 52. Thus, the bellmouth 56 interconnects the interior side 50 and the exterior side 52 of the first, aft door 30. The bellmouth 56 is defined by a super-ellipse 70. The super-ellipse 70 has a first, major axis 72 and a second, minor axis 74. In one example, the bellmouth 56 is formed or defined such that the minor axis 74 is substantially perpendicular to the exterior side 52 of the first, aft door 30 and the major axis 72 is substantially parallel to the exterior side 52 of the first, aft door 30. Stated another way, the minor axis 74 of the bellmouth 56 may be defined such that the minor axis 74 extends transverse to the plane P defined along the surface of the exterior side 52. In one example, the minor axis 74 is substantially perpendicular to the plane P and the exterior side 52, and the major axis 72 is substantially parallel to the plane P and the exterior side 52. Generally, the minor axis 74 is orientated to extend along the tip 50a and the first end 52a. An exterior surface of the super-ellipse 70 is substantially tangent to the exterior side 52 of the first, aft door 30 at a point of intersection or vertex 76 of the minor axis 74 and the exterior side 52. Thus, the vertex 76 on the minor axis 74 of the super-ellipse 70 is a tangency point between a surface of the super-ellipse 70 and the exterior side 52.

The super-elliptical shape for the bellmouth 56 provides a continuously curved surface, which provides for continuous flow acceleration without separation from the surface. This prevents the generation of tonal noise associated with the outflow valve 22. In addition, the bellmouth 56 enables the elimination of vortex generators or other airflow field interrupters, which reduces the broadband noise levels associated with the outflow valve 22. Due to its curved geometry, the continuous curved surface of the bellmouth 56 conditions pressurized airflow through outflow valve 22 to promote laminar flow, to decrease the production of noise, and to increase the production of forward thrust. The super-elliptical shape of the bellmouth 56 provides optimal flow conditioning in the normal cruise position of the outflow valve 22, which may be, for example, a partially open position of the outflow valve 22 offset from the fully closed position (FIG. 3) by an angular displacement of about 0 to about 22 degrees.

In order to determine the major axis 72 and the minor axis 74 for the super-ellipse 70 that defines the shape of the bellmouth 56, in one example, the following equation is used:

$$\left(\frac{x}{X}\right)^{2.2} + \left(\frac{y}{Y}\right)^{2.2} = 1 \qquad (1)$$

In the above equation, X is the major axis and Y is the minor axis of the super-ellipse 70. In one embodiment, the semi-major axis X/2 is about 1.0 inches (in.) to about 1.5 inches (in.), and in one example, X/2 is about 1.32 inches (in.). The semi-minor axis Y/2 is about 0.50 inches (in.) to about 1.0 inches (in.), and in one example, Y/2 is about 0.66 inches (in.). Thus, according to the above-equation, the super-ellipse 70 is defined as a closed curve contained within a rectangle of −X≤x≤+X and −Y≤y≤+Y. In one example, the semi-minor axis Y/2 is between about 15% and about 35% of the equivalent circular diameter of an area defined by the first, aft door 30 and the second, forward door 32 when opened during decent or climb operation of the aircraft 10.

Figure 5:
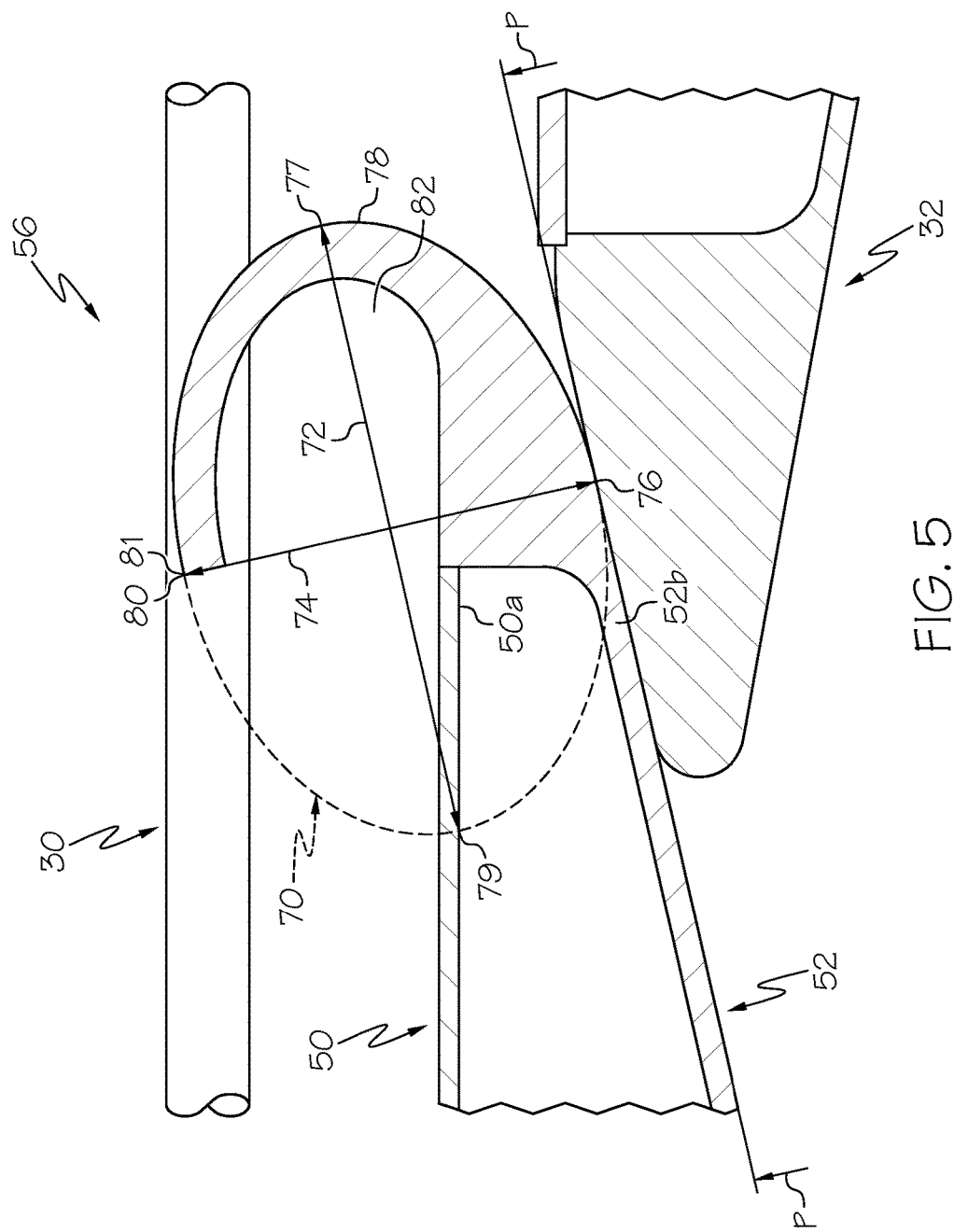
FIG. 5 is detail view of a super-elliptical bellmouth of the outflow valve of FIG. 1, taken from area 5 in FIG. 3, in accordance with various embodiments.

In order to form the bellmouth 56 on the first, aft door 30, with the super-ellipse 70 determined from equation (1), the minor axis 74 is aligned to be substantially perpendicular to the exterior side 52. As illustrated in FIG. 5, the super-ellipse 70 has four vertices, 76, 77, 79, 80. The vertices 77 and 79 are on the major axis 72 and the vertices 76 and 80 are on the minor axis 74. Thus, the vertex 77 is a first major vertex and the vertex 79 is a second major vertex, which is opposite the first major vertex. The vertex 76 is a first minor vertex and the vertex 80 is a second minor vertex, which is opposite the first minor vertex. The bellmouth 56 is defined or formed to follow the super-ellipse 70 from the vertex 76 of the minor axis 74 and the exterior side 52, along an arc 78 between the vertex 76 and a second point 81 that may be located at the opposite vertex 80 of the super-ellipse 70. Alternatively, the bellmouth 56 may be extended to a point on the arc 78 that is between the vertex 80 and the vertex 77, or may be reduced to extend to a point on the arc 78 that is between the vertex 76 and the vertex 77. As a further alternative, the bellmouth 56 may be extended to a point on the arc 78 of the super-ellipse 70 that is beyond the vertex 80 in a direction towards the vertex 79, and may be extended to a point on the arc 78 of the super-ellipse 70 that is near the vertex 79.

At the second point 81, the bellmouth 56 curves inward towards the interior side 50 to form a substantially U-shape, which defines a channel 82. The channel 82 is defined to extend substantially along a width of the bellmouth 56. In one embodiment, the bellmouth 56 is integrally formed with the first, aft door 30; i.e., the bellmouth 56 and the first, aft door 30 are formed as a unitary piece machined (e.g., milled) from an alloy or metal (e.g., aluminum) blank. Alternatively, the bellmouth 56 may be formed as a separate piece and then affixed to the first, aft door 30 utilizing, for example, a dovetail arrangement and/or a plurality of fasteners (e.g., bolts). In this latter case, the first, aft door 30 and the bellmouth 56 may each be formed from a lightweight alloy or metal (e.g., aluminum); however, generally, the first, aft door 30 is formed from a lightweight alloy or metal (e.g., aluminum), while the bellmouth 56 is formed from a second, different material. The second material is generally a lightweight, relatively inexpensive, and/or flexible composite or polymer. A non-exhaustive list of suitable materials includes fiber-reinforced polyetherimide (PEI), fiber-reinforced polyetheretherketon (PEEK), and other moldable plastics.

With reference to FIG. 3, the second, forward door 32 includes a third interior side 90, a fourth exterior side 92, an end 94 and a tip section 96. The third interior side 90 is contained within the cabin 14 in the fully closed position (FIG. 3) and is subject to an air pressure within the cabin 14. Generally, the third interior side 90 is substantially planar from a tip 90a of the third interior side 90 to a base 90b of the third interior side 90. With reference to FIG. 2, the second arm 38 is coupled to the third interior side 90, and is generally coupled to the third interior side 90 so as to be at a first end 98 of the second, forward door 32, which is substantially opposite a second end 100 of the second, forward door 32. The second end 100 of the second, forward door 32 includes a second pivot 102. The second pivot 102 forms a pivot point for the second, forward door 32 relative to the frame 34. In one example, the second pivot 102 comprises a second pivot pin 102a, which is received within a corresponding bore 104 defined through the frame 34. The second pivot pin 102a may be retained within the bore 104 via any suitable mechanism, such as a nut, cotter pin, etc. It should be noted that any suitable arrangement may be used to pivotably couple the second, forward door 32 to the frame 34, and thus, the second pivot 102 is merely exemplary. Moreover, the second, forward door 32 may include a bore that receives a pivot pin associated with the frame 34.

With reference to FIG. 3, the fourth exterior side 92 is generally opposite the third interior side 90. The fourth exterior side 92 is external to the cabin 14 when the outflow valve 22 is in the fully closed position and is subject to the ambient pressure 16. The fourth exterior side 92 includes a first end 92a, a second end 92b and a transition 106. The first end 92a is disposed substantially opposite the tip 90a of the third interior side 90 and the second end 92b is disposed substantially opposite the base 90b of the third interior side 90. The transition 106 is defined between the first end 92a and the second end 92b. In one example, the fourth exterior side 92 extends along an axis A to from the first end 92a to the transition 106, and the fourth exterior side 92 extends along an axis B from the second end 92b to the transition 106. The axis B is transverse to the axis A, such that the second end 92b is offset relative to the first end 92a. The transition 106 may be slightly rounded or curved.

The end 94 extends between the base 90b of the third interior side 90 and the second end 92b of the fourth exterior side 92. Thus, the end 94 is generally adjacent to the frame 34 when the second, forward door 32 is coupled to the frame 34. In one example, the end 94 includes a second seal 108. The second seal 108 may extend substantially along an entirety of the end 94 to seal against the frame 34. It should be noted that while not illustrated herein, the second seal 108 may also extend along the first end 98 and the second end 100 of the second, forward door 32 (FIG. 2) to seal the edges of the second, forward door 32 against the frame 34 in the fully closed position (FIG. 3). The second seal 108 may be partially embedded within (e.g., dovetail with) a slot 94a defined in the end 94. If desired, the second seal 108 may be energized by a wave spring or other suitable means. The second seal 108 may be formed from various conventionally-known polymeric materials including, for example, extruded silicone or polytetrafluoroethylene (e.g., Teflon®). The second seal 108 may comprise a single piece or a multi-piece seal.

The tip section 96 extends between the tip 90a of the third interior side 90 and the first end 92a of the fourth exterior side 92. Thus, the tip section 96 is generally adjacent to and is in contact with the first, aft door 30 when the outflow valve 22 is in the fully closed position (FIG. 3). Generally, the tip section 96 tapers from the tip 90a to a distalmost end 96a of the tip section 96 such that a first surface 110 of the tip section 96 has a negative slope. The tip section 96 is generally planar from the distalmost end 96a to the first end 92a, such that a second surface 112 of the tip section 96 is generally planar.

With reference to FIG. 2, the frame 34 substantially surrounds each of the first, aft door 30 and the second, forward door 32. The frame 34 includes the bore 64 and the bore 104, which receive the pivot pins 62a and 102a, respectively, to pivotably couple each of the first, aft door 30 and the second, forward door 32 to the frame 34. Generally, the frame 34 is configured to be affixed (e.g., bolted) to a mounting structure provided on the aircraft 10. For example, and as previously stated, the frame 34 may be mounted through a wall of the fuselage 10a of the aircraft 10. The frame 34 may be composed of a suitable metal or metal alloy, and formed using a suitable technique, such as casting, milling, etc. The frame 34 is generally shaped to cooperate and receive each of the first, aft door 30 and the second, forward door 32, and thus, in this example, the frame 34 is generally rectangular. The frame 34 also includes one or more supports 116, which couple the actuator 20 to the frame 34. Generally, each of the one or more supports 116 extend upwardly away from a main portion of the frame 34 such that the actuator 20 is coupled a distance above each of the first, aft door 30 and the second, forward door 32. It should be noted, however, that this arrangement is merely an example, as the actuator 20 may be coupled to the first, aft door 30 and the second, forward door 32 in any suitable arrangement. In one example, the actuator 20 is coupled to a support 116a and a support 116b.

In order to assemble the cabin pressure control system 12, in one example, the actuator 20 is coupled to the one or more supports 116 of the frame 34. The master linkage 40 is coupled to the actuator 20. With the second seal 108 coupled to the end 94 of the second, forward door 32, the second, forward door 32 is positioned within the frame 34 such that the second pivot pin 102a is received within the bore 104. With the first seal 68 coupled to the end 54 of the first, aft door 30, the first, aft door 30 is coupled to the frame 34 such that the pivot pin 62a is received within the bore 64. The first arm 36 is coupled to the master linkage 40, and the slave linkage 44 is coupled between the first arm 36 and the second arm 38. With the actuator 20 and the outflow valve 22 assembled, the frame 34 may be coupled to the fuselage 10a of the aircraft 10 through a suitable fastening technique (e.g. bolts, rivets, adhesives, welding, etc.) and the actuator 20 may be placed in communication with the controller 18. The controller 18 is in communication with the one or more inputs 24.

Based on receipt of the one or more inputs 24, or based on the predetermined schedule, the controller 18 commands the actuator 20 to move the first, aft door 30 and the second, forward door 32 of the outflow valve 22 into one of various positions, including, but not limited to, the fully open position, the fully closed position and a position in-between the fully opened position and the fully closed position. For example, the controller 18 may command the actuator 20 to move the outflow valve 22 from the fully closed position (FIG. 3) to the fully opened position (FIG. 4). In this example, the master linkage 40 and the slave linkage 44 move or pivot the first, aft door 30 and the second, forward door 32 substantially simultaneously into the fully opened position such that air from the cabin 14 may pass through a space 120 (FIG. 4) defined between the first, aft door 30 and the second, forward door 32 into the ambient pressure 16 or the environment external to the aircraft 10 to reduce cabin pressure and/or to increase thrust of the aircraft 10.

As a further example, the controller 18 may command the actuator 20 to move the outflow valve 22 from the fully closed position (FIG. 3) to a position between the fully closed position and the fully opened position (FIG. 4), such as during a cruise operation of the aircraft 10. In this example, the master linkage 40 and the slave linkage 44 move or pivot the first, aft door 30 and the second, forward door 32 substantially simultaneously into the intermediate position such that air from the cabin 14 may pass through a space defined between the first, aft door 30 and the second, forward door 32 into the ambient pressure 16 or the environment external to the aircraft 10 to maintain cabin pressure within the aircraft 10.

Due to the shape of the bellmouth 56 defined by the super-ellipse 70, airflow into the space defined between the first, aft door 30 and the second, forward door 32 in the fully opened position (FIG. 4) or in an intermediate position has a laminar flow due to the continuously curved surface of the bellmouth 56. By defining the bellmouth 56 with the super-elliptical shape and orientating the minor axis 74 of the super-ellipse 70 substantially perpendicular to the exterior side 52, the tonal noise and broadband noise associated with the operation of the outflow valve 22 is reduced, while maintaining pressure within the cabin 14 and providing additional thrust to the aircraft 10 as needed.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An outflow valve comprising:
   a frame;
   a first door rotatably coupled to the frame, the first door having a first side opposite a second side and a bellmouth, the bellmouth defined by a super-ellipse having a major axis and a minor axis, with the major axis of the super-ellipse parallel to the second side and the minor axis of the super-ellipse perpendicular to the second side, the minor axis having a first minor vertex opposite a second minor vertex, the bellmouth defined along an arc between the first minor vertex and the second minor vertex, and the bellmouth terminates at the second minor vertex; and
   a second door rotatably coupled to the frame,
   wherein the first door and the second door are simultaneously movable between at least a first position and a second position.

2. The outflow valve of claim 1, wherein the second side further comprises a profile defined between a first end and a second end of the second side.

3. The outflow valve of claim 2, wherein the profile is rounded with a continuous curvature.

4. The outflow valve of claim 1, wherein the bellmouth curves radially inward towards the first side.

5. The outflow valve of claim 1, wherein the bellmouth defines a channel that extends longitudinally from a first end of the first door to a second end of the first door.

6. The outflow valve of claim 1, wherein the second door has a third side opposite a fourth side, the third side and the fourth side interconnected via a tip section and the fourth side includes a transition such that a first end of the fourth side is offset from a second end of the fourth side.

7. The outflow valve of claim 1, wherein the first side of the first door is subject to a first source of pressure and the second side of the first door is subject to a second source of pressure, the first source of pressure different than the second source of pressure.

8. A cabin pressure control system, comprising:
   an actuator;
   an outflow valve having a frame, a first door and a second door, the first door and the second door rotatably coupled to the frame and at least one of the first door and the second door coupled to the actuator to be movable by the actuator, the first door having a first side, a second side and including a bellmouth defined by a super-ellipse having a minor axis and a major axis, the minor axis of the super-ellipse is perpendicular to the second side, the major axis of the super-ellipse is parallel to the second side, the minor axis having a first minor vertex opposite a second minor vertex, the major axis having a first major vertex and a second major vertex, the bellmouth defined along an arc that extends between the first minor vertex, the first major vertex and the second minor vertex, the bellmouth terminates at the second minor vertex, the second major vertex disposed below an exterior surface of the first side and the second side including a profile defined along a portion of the second side between a first end and a second end of the second side; and
   a controller in communication with the actuator that commands the actuator to move the outflow valve between at least a first position and a second position.

9. The cabin pressure control system of claim 8, wherein the bellmouth curves radially inward towards the first side.

10. The cabin pressure control system of claim 8, wherein the first door is coupled to the second door such that the actuator moves the first door and the second door simultaneously.

11. The cabin pressure control system of claim 8, wherein the first minor vertex on the minor axis of the super-ellipse is a tangency point between a surface of the super-ellipse and the second side.

12. The cabin pressure control system of claim 8, wherein the second door includes a third side and a fourth side, the third side and the fourth side interconnected via a tip section and the fourth side includes a transition such that a first end of the fourth side is offset from a second end of the fourth side.

13. The cabin pressure control system of claim 8, wherein the bellmouth defines a channel that extends longitudinally from a first end of the first door to a second end of the first door.

14. The cabin pressure control system of claim 8, wherein the outflow valve is coupled to a fuselage of an aircraft, and the second door is forward of the first door in a direction of flight of the aircraft.

15. An aircraft, comprising:
   a fuselage that encloses a cabin; and
   a cabin pressure control system coupled to the fuselage, the cabin pressure control system operable for venting a fluid from the cabin into an environment external to the aircraft, the cabin pressure control system including:
   an actuator;
   an outflow valve having a frame, a first door and a second door, the first door and the second door rotatably coupled to the frame and at least one of the first door and the second door coupled to the actuator to be movable by the actuator, the first door having a first side, a second side and including a bellmouth defined by a super-ellipse having a major axis and a minor axis, the minor axis of the super-ellipse is perpendicular to the second side and the major axis of the super-ellipse is parallel to the second side, the minor axis having a first minor vertex opposite a second minor vertex, the bellmouth defined along an arc between the first minor vertex and the second minor vertex, the bellmouth terminates at the second minor vertex, the second side including a rounded profile defined along a portion of the second side between a first end and a second end of the second side, and the second door coupled to the frame so as to be forward of the first door in a direction of flight of the aircraft; and
   a controller in communication with the actuator that commands the actuator to move the outflow valve between at least a first position and a second position for venting the fluid.

16. The aircraft of claim 15, wherein the first door is coupled to the second door such that the actuator moves the first door and the second door simultaneously.

17. The aircraft of claim 15, wherein the second door includes a third side and a fourth side, the third side and the fourth side interconnected via a tip section and the fourth side includes a transition such that a first end of the fourth side is offset from a second end of the fourth side.

18. The aircraft of claim 15, wherein the first door overlaps the second door in the first position.

19. The aircraft of claim 15, wherein the first side of the first door is subject to a pressure of the cabin and the second side of the first door is subject to a pressure external to the aircraft.

* * * * *